United States Patent
Cao et al.

(10) Patent No.: US 10,631,309 B2
(45) Date of Patent: Apr. 21, 2020

(54) DEVICE-TO-DEVICE D2D DATA TRANSMISSION METHOD, APPARATUS, AND SYSTEM

(71) Applicant: HUAWEI TECHNOLOGIES CO., LTD., Shenzhen, Guangdong (CN)

(72) Inventors: Zhenzhen Cao, Beijing (CN); Tao Zhang, Beijing (CN); Bo Lin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/894,079

(22) Filed: Feb. 12, 2018

(65) Prior Publication Data

US 2018/0167956 A1 Jun. 14, 2018

Related U.S. Application Data (63) Continuation of application No. PCT/CN2015/087076, filed on Aug. 14, 2015.

(51) Int. Cl.
*H04W 72/10* (2009.01)
*H04W 76/10* (2018.01)
(Continued)

(52) U.S. Cl.
CPC .......... *H04W 72/10* (2013.01); *H04W 76/10* (2018.02); *H04W 76/14* (2018.02); *H04W 88/04* (2013.01); *H04W 88/08* (2013.01)

(58) Field of Classification Search
CPC ..... H04W 72/10; H04W 76/02; H04W 76/10; H04W 76/14; H04W 88/04; H04W 88/08;
(Continued)

(56) References Cited

U.S. PATENT DOCUMENTS 9,288,829 B2 * 3/2016 Park ................. H04W 56/00
9,629,192 B2 * 4/2017 Zeng ................ H04W 72/0453
(Continued)

FOREIGN PATENT DOCUMENTS

CN 102741650 A 10/2012
CN 104378825 A 2/2015
(Continued)

OTHER PUBLICATIONS

Extended European Search Report dated Jun. 26, 2018, in corresponding European Patent Application No. 15901253.3, 6 pgs.
(Continued)

*Primary Examiner* — Tri H Phan
(74) *Attorney, Agent, or Firm* — Kilpatrick Townsend & Stockton LLP (57) ABSTRACT

Embodiments of the present invention provide a device-to-device D2D data transmission method, apparatus, and system. The method includes: receiving first data sent by a second device by using a first logical channel of multiple logical channels on a first link, and identifying a first channel feature of the first logical channel; determining, according to preset configuration information about a correspondence between channel feature information about the first link and channel feature information about a second link, a second channel feature on the second link that corresponds to the first channel feature of the first logical channel on the first link; and mapping, according to the second channel feature, the first data onto a second logical channel that that is of multiple logical channels on the second link and that corresponds to the second channel feature.

17 Claims, 4 Drawing Sheets

(51) Int. Cl.
*H04W 76/14* (2018.01)
*H04W 88/04* (2009.01)
*H04W 88/08* (2009.01)

(58) Field of Classification Search
CPC . H04W 72/00; H04W 72/04; H04W 72/0413; H04W 72/042; H04W 72/0453; H04W 72/0486; H04W 72/1284; H04W 76/00; H04W 76/11; H04W 76/15; H04W 76/20; H04W 76/23; H04W 76/25
See application file for complete search history.

(56) References Cited

U.S. PATENT DOCUMENTS

| | | | | |
|---|---|---|---|---|
| 9,648,623 | B2* | 5/2017 | Seo | H04L 5/001 |
| 9,814,045 | B2* | 11/2017 | Kwon | H04L 45/302 |
| 9,853,709 | B2* | 12/2017 | Ryu | H04B 7/15507 |
| 9,974,066 | B2* | 5/2018 | Novlan | H04W 72/042 |
| 10,091,828 | B2* | 10/2018 | Lee | H04W 76/14 |
| 2012/0093070 | A1* | 4/2012 | Huang | H04B 7/2606 370/315 |
| 2013/0003650 | A1 | 1/2013 | Han et al. | |
| 2014/0112263 | A1* | 4/2014 | Lee | H04W 72/1289 370/329 |
| 2015/0124735 | A1 | 5/2015 | Cho et al. | |
| 2015/0305080 | A1 | 10/2015 | Xu et al. | |
| 2016/0143078 | A1 | 5/2016 | Jeong | |
| 2016/0183276 | A1* | 6/2016 | Marinier | H04W 72/02 370/329 |
| 2017/0171837 | A1 | 6/2017 | Chen et al. | |
| 2017/0181150 | A1* | 6/2017 | Lee | H04W 76/14 |
| 2017/0245292 | A1* | 8/2017 | Agiwal | H04W 28/02 |
| 2018/0167945 | A1* | 6/2018 | Cao | H04W 72/04 |

FOREIGN PATENT DOCUMENTS

| | | |
|---|---|---|
| CN | 104618849 A | 5/2015 |
| CN | 104811892 A | 7/2015 |
| EP | 3313132 A1 | 4/2018 |
| WO | 2014/110797 A1 | 7/2014 |
| WO | 2015/016646 A1 | 2/2015 |
| WO | 2015021185 A1 | 2/2015 |

OTHER PUBLICATIONS

"3$^{rd}$ Generation Partnership Project; Technical Specification Group Radio Access Network; Evolved Universal Terrestrial Radio Access (E-UTRA); medium Access Control (MAC) protocol specification (Release 12)," 3GPP TS 36.321, V12.6.0, Jun. 2015, 77 pgs.

"3$^{rd}$ Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.6.0., Jun. 2015, 449 pgs.

International Search report dated May 19, 2016, in corresponding International Patent Application No. PCT/CN2015/087076, 4 pgs.

International Search Report dated May 19, 2016 in corresponding International Patent Application No. PCT/CN2015/087076.

* cited by examiner

FIG. 1

A first device receives first data sent by a second device by using a first logical channel of multiple logical channels on a first link, and identifies a first channel feature of the first logical channel ─ S201

The first device determines, according to preset configuration information about a correspondence between channel feature information about the first link and channel feature information about a second link, a second channel feature on the second link that corresponds to the first channel feature of the first logical channel on the first link ─ S202

The first device maps, according to the second channel feature, the first data onto a second logical channel that is of multiple logical channels on the second link and that corresponds to the second channel feature, to forward the first data to a third device by using the second logical channel ─ S203

DEVICE-TO-DEVICE D2D DATA TRANSMISSION METHOD, APPARATUS, AND SYSTEM

CROSS-REFERENCE TO RELATED APPLICATIONS

This application is a continuation of International Application No. PCT/CN2015/087076, filed on Aug. 14, 2015, the disclosure of which is hereby incorporated by reference in its entirety.

TECHNICAL FIELD

The present disclosure relates to the field of wireless network technologies, and in particular, to a device-to-device D2D data transmission method, apparatus, and system.

BACKGROUND

In cellular communication, user equipment first sends data to a base station by using an air interface, and then the base station forwards the data to a target node on a network. A difference between device-to-device (D2D) communication and existing cellular communication is that data of user equipment is directly sent to another user equipment by using an air interface without being forwarded by a base station, to reduce a delay caused by forwarding on a network. Currently, D2D supports unicast communication. That is, user equipment can directly send data to another user equipment. D2D also supports multicast communication. That is, user equipment can directly send data to multiple other user equipments in a communication group. In addition, in device-to-device D2D communication, data sent by user equipment has multiple priorities. Data of different types have different priorities. For example, a priority of voice data may be higher than that of regular file transmission data.

Figure 1:
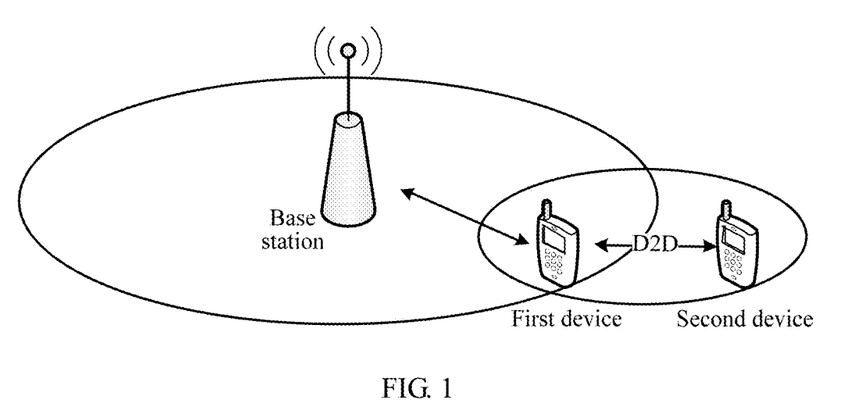
FIG. 1 is a schematic diagram of device-to-device D2D data transmission according to the prior art.

In an existing technical solution, a D2D data transmission link supports that user equipment serving as a relay node helps another device perform cellular network communication. As shown in FIG. 1, a second device may send data to a base station by using a first device, and the base station may also send data to the second device by using the first device. A first link between the first device and the base station and a second link between the second device and the first device each have multiple logical channels, and each of the logical channels can correspondingly transmit data having one priority. However, after the base station sends data having multiple priorities to the first device by using multiple logical channels on the first link, the first device maps the data having different priorities onto a same logical channel on the second link to transmit the data to the second device. Consequently, data having a higher priority cannot be preferably processed, affecting the data processing efficiency.

SUMMARY

The present invention provides a device-to-device D2D data transmission method, apparatus, and system. When data having different priorities is forwarded, the data may be mapped onto different logical channels for transmission, so that the data having different priorities is processed according to the different priorities, and data processing efficiency is improved.

A first aspect of embodiments of the present invention provides a device-to-device D2D data transmission method, including:

receiving, by a first device, first data sent by a second device by using a first logical channel of multiple logical channels on a first link, and identifying a first channel feature of the first logical channel;

determining, by the first device according to preset configuration information about a correspondence between channel feature information about the first link and channel feature information about a second link, a second channel feature on the second link that corresponds to the first channel feature of the first logical channel on the first link; and mapping, by the first device according to the second channel feature, the first data onto a second logical channel that is of multiple logical channels on the second link and that corresponds to the second channel feature, to forward the first data to a third device by using the second logical channel.

In a first possible implementation of the first aspect, the second device includes a base station or a core network device, and before the receiving first data sent by a second device by using a first logical channel of multiple logical channels on a first link, the method further includes:

receiving, by the first device, the configuration information about the correspondence that is sent by the base station or the core network device and that is between the channel feature information about the first link and the channel feature information about the second link.

In a second possible implementation of the first aspect, the third device includes a base station or a core network device, and before the receiving first data sent by a second device by using a first logical channel of multiple logical channels on a first link, the method further includes:

receiving, by the first device, the configuration information about the correspondence that is sent by the base station or the core network device and that is between the channel feature information about the first link and the channel feature information about the second link.

In a third possible implementation of the first aspect, the mapping, according to the second channel feature, the first data onto a second logical channel that is of multiple logical channels on the second link and that corresponds to the second channel feature includes:

determining, by the first device according to the second channel feature, the second logical channel that is of the multiple logical channels on the second link and that corresponds to the second channel feature; and mapping, by the first device, the first data onto the determined second logical channel.

With reference to the first aspect and the first to the third possible implementations of the first aspect, in a third possible implementation of the first aspect, the channel feature information includes at least one of a logical channel identifier, a data priority corresponding to a logical channel, or a logical channel priority.

A second aspect of the embodiments of the present invention provides a device-to-device D2D data transmission method, including:

obtaining, by a second device, first data; and sending, by the second device, the first data to a first device by using a first logical channel of multiple logical channels on a first link, so that the first device determines, according to preset configuration information about a correspondence between channel feature information about the first link and channel feature information about a second link, a second channel feature on the second link that corresponds to a first channel feature of the first logical channel on the first link, and the first device further maps, according to the second channel feature, the first data onto a second logical channel that is of multiple logical channels on the second link and that corresponds to the second channel feature, to forward the first data to a third device by using the second logical channel.

In a first possible implementation of the second aspect, the second device includes a base station or a core network device, and before the obtaining first data, the method further includes:

sending, by the base station or the core network device, the configuration information about the correspondence between the channel feature information about the first link and the channel feature information about the second link to the first device.

In a second possible implementation of the second aspect, the sending the first data to a first device by using a first logical channel of multiple logical channels on a first link includes:

determining, by the second device, a channel feature of each of the logical channels on the first link; and mapping, by the second device according to the determined channel feature of each of the logical channels on the first link, the first data onto the first logical channel on the first link.

With reference to the second aspect and the first to the second possible implementations of the second aspect, in a third possible implementation of the second aspect, the channel feature information includes at least one of a logical channel identifier, a data priority corresponding to a logical channel, or a logical channel priority.

A third aspect of the embodiments of the present invention provides a device-to-device D2D data transmission apparatus, including:

a receiving module, configured to: receive first data sent by a second device by using a first logical channel of multiple logical channels on a first link, and identify a first channel feature of the first logical channel;

a processing module, configured to: determine, according to preset configuration information about a correspondence between channel feature information about the first link and channel feature information about a second link, a second channel feature on the second link that corresponds to the first channel feature of the first logical channel on the first link; and a sending module, configured to: map, according to the second channel feature, the first data onto a second logical channel that is of multiple logical channels on the second link and that corresponds to the second channel feature, to forward the first data to a third device by using the second logical channel.

In a first possible implementation of the third aspect, the second device includes a base station or a core network device; and the receiving module is further configured to receive the configuration information about the correspondence that is sent by the base station or the core network device and that is between the channel feature information about the first link and the channel feature information about the second link.

In a second possible implementation of the third aspect, the third device includes a base station or a core network device; and the receiving module is further configured to receive the configuration information about the correspondence that is sent by the base station or the core network device and that is between the channel feature information about the first link and the channel feature information about the second link.

In a third possible implementation of the third aspect, the sending module is specifically configured to:

determine, according to the second channel feature, the second logical channel that is of the multiple logical channels on the second link and that corresponds to the second channel feature; and map the first data onto the determined second logical channel.

With reference to the third aspect and the first to the third possible implementations of the third aspect, in a third possible implementation of the third aspect, the channel feature information includes at least one of a logical channel identifier, a data priority corresponding to a logical channel, or a logical channel priority.

A fourth aspect of the embodiments of the present invention provides a device-to-device D2D data transmission apparatus, including:

an obtaining module, configured to obtain first data; and a sending module, configured to send the first data to a first device by using a first logical channel of multiple logical channels on a first link, so that the first device determines, according to preset configuration information about a correspondence between channel feature information about the first link and channel feature information about a second link, a second channel feature on the second link that corresponds to a first channel feature of the first logical channel on the first link, and the first device further maps, according to the second channel feature, the first data onto a second logical channel that is of multiple logical channels on the second link and that corresponds to the second channel feature, to forward the first data to a third device by using the second logical channel.

In a first possible implementation of the fourth aspect, the sending module is further configured to send the configuration information about the correspondence between the channel feature information about the first link and the channel feature information about the second link to the first device.

In a second possible implementation of the fourth aspect, the sending module is specifically configured to:

determine a channel feature of each of the logical channels on the first link; and map, according to the determined channel feature of each of the logical channels on the first link, the first data onto the first logical channel on the first link.

With reference to the fourth aspect and the first to the second possible implementations of the fourth aspect, in a third possible implementation of the fourth aspect, the channel feature information includes at least one of a logical channel identifier, a data priority corresponding to a logical channel, or a logical channel priority.

A fifth aspect of the embodiments of the present invention provides a device-to-device D2D data system, including a first device and a second device, where the first device includes any one of the apparatuses described above, and the second device includes any one of the apparatuses described above.

A sixth aspect of the embodiments of the present invention provides a device-to-device D2D data transmission apparatus, including a network interface, a memory, and a processor, where the memory stores a set of program code, and the processor is configured to invoke the program code stored in the memory, to perform the following operations:

receiving first data sent by a second device by using a first logical channel of multiple logical channels on a first link, and identifying a first channel feature of the first logical channel;

determining, according to preset configuration information about a correspondence between channel feature information about the first link and channel feature information about a second link, a second channel feature on the second link that corresponds to the first channel feature of the first logical channel on the first link; and mapping, according to the second channel feature, the first data onto a second logical channel that is of multiple logical channels on the second link and that corresponds to the second channel feature, to forward the first data to a third device by using the second logical channel.

According to the embodiments of the present invention, to resolve a technical problem in the prior art that data having different priorities is mapped onto a same logical channel for transmission, the first device first receives the first data sent by the second device by using the first logical channel of the multiple logical channels on the first link, and identifies the first channel feature of the first logical channel; then determines, according to the preset configuration information about the correspondence between the channel feature information about the first link and the channel feature information about the second link, the second channel feature on the second link that corresponds to the first channel feature of the first logical channel on the first link; and finally maps, according to the second channel feature, the first data onto the second logical channel that is of the multiple logical channels on the second link and that corresponds to the second channel feature, to forward the first data to the third device by using the second logical channel. Therefore, when data having different priorities is forwarded, the data may be mapped onto different logical channels for transmission, so that the data having different priorities is processed according to the different priorities, and data processing efficiency is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The technologies described in this specification may be applied to various communications systems, including a 2G communications system, a 3G communications system, and a next-generation communications system, for example, a 2G communications system such as Global System for Mobile Communications (GSM, global system for mobile communication); a 3G communications system such as Wideband Code Division Multiple Access (WCDMA, wideband code division multiple access), and Time Division-Synchronous Code Division Multiple Access (TD-SCDMA, time division-synchronization code division multiple access); and a next-generation communications system such as Long Term Evolution (LTE, long-term evolution) communications system and a subsequent evolved system of the LTE communications system.

Figure 2:
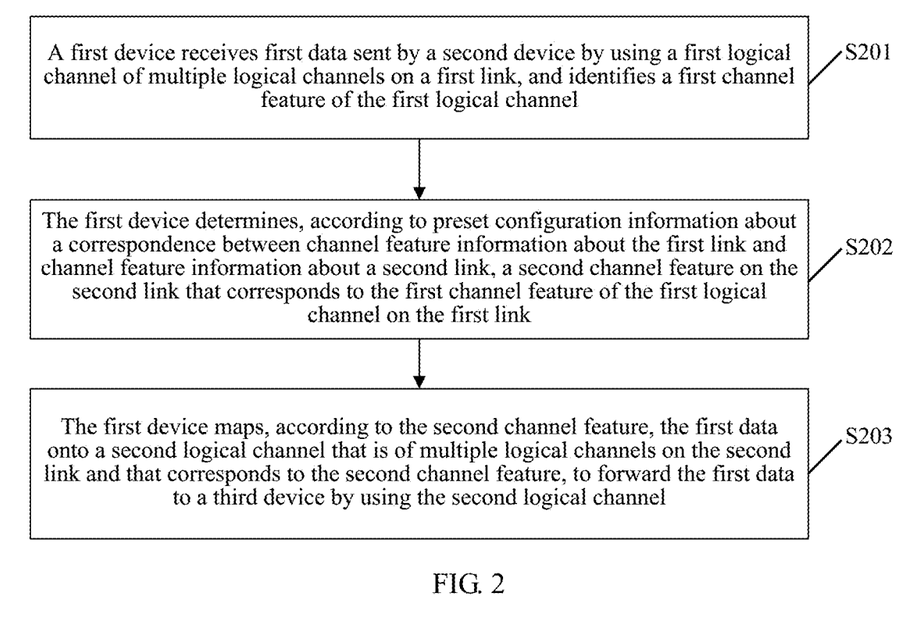
FIG. 2 is a schematic flowchart of a device-to-device D2D data transmission method according to a first embodiment of the present invention.

Referring to FIG. 2, FIG. 2 is a schematic flowchart of a device-to-device D2D data transmission method according to a first embodiment of the present invention. As shown in the figure, the method in this embodiment of the present invention includes the following steps:

S201. A first device receives first data sent by a second device by using a first logical channel of multiple logical channels on a first link, and identifies a first channel feature of the first logical channel.

In a specific implementation, data may include data having multiple priorities, the first data may be data having a priority of the data having multiple priorities, and each of the multiple logical channels is used to transmit data having a priority. The second device may first obtain the first data; and then send the first data to the first device by using the first logical channel of the multiple logical channels on the first link, to send the first data to the first device. After receiving the first data, the first device may obtain the first channel feature of the first logical channel by identifying the first logical channel by using which the first data is transmitted.

Figure 8:
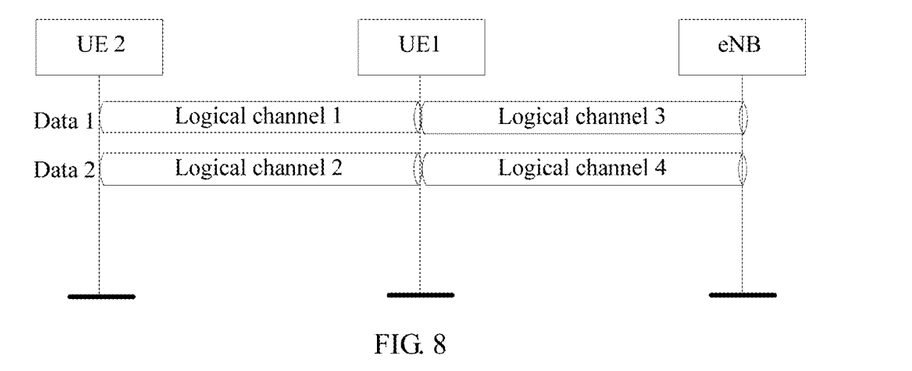
FIG. 8 is a schematic structural diagram of data mapping according to an embodiment of the present invention.

For example, as shown in FIG. 8, the data having multiple priorities includes data 1 and data 2. A priority of the data 1 is higher than that of the data 2. The first link includes a logical channel 1 and a logical channel 2. A priority of the logical channel 1 is higher than that of the logical channel 2. Therefore, the second device may map the data 1 onto the logical channel 1, and map the data 2 onto the logical channel 2. After the data is transmitted to the first device by using the logical channel 1 and the logical channel 2, the first device may identify a channel feature of the logical channel 1 and a channel feature of the logical channel 2.

S202. The first device determines, according to preset configuration information about a correspondence between channel feature information about the first link and channel feature information about a second link, a second channel feature on the second link that corresponds to the first channel feature of the first logical channel on the first link.

In a specific implementation, the second device may include a base station or a core network device, or a third device may include a base station or a core network device. Before receiving the first data sent by the second device by using the first logical channel of the multiple logical channels on the first link, the first device may receive the configuration information about the correspondence that is sent by the base station or the core network device and that is between the channel feature information about the first link and the channel feature information about the second link. The channel feature information may include at least one of a logical channel identifier, a data priority corresponding to a logical channel, or a logical channel priority. The first device may first search the preset configuration information about the correspondence between channel feature information about the first link and channel feature information about a second link for the first channel feature of the first logical channel, and then determine the second channel feature on the second link that corresponds to the first channel feature of the first logical channel.

For example, as shown in FIG. 8, the first link includes the logical channel 1 and the logical channel 2, and the second link includes a logical channel 3 and a logical channel 4. A channel identifier of the logical channel 1 corresponds to that of the logical channel 3, and a channel identifier of the logical channel 2 corresponds to that of the logical channel 4. Therefore, after receiving the data 1 transmitted by using the logical channel 1 and the data 2 transmitted by using the logical channel 2, the first device may determine that the data 1 needs to be mapped onto the logical channel 3, and the data 2 needs to be mapped onto the logical channel 4, to forward the data to the third device.

S203. The first device maps, according to the second channel feature, the first data onto a second logical channel that is of multiple logical channels on the second link and that corresponds to the second channel feature, to forward the first data to a third device by using the second logical channel.

In a specific implementation, the first device first determines, according to the second channel feature, the second logical channel that is of the multiple logical channels on the second link and that corresponds to the second channel feature; and then maps the first data onto the determined second logical channel.

In addition, if data sent by the second device has only one priority, and is transmitted to the first device by using a logical channel on the first link, the first device may determine, in the configuration information about the correspondence between the channel feature information about the first link and the channel feature information about the second link according to a first channel feature of the logical channel, the second channel feature on the second link that corresponds to the first channel feature, and map, according to the second channel feature, the data having the priority onto the second logical channel that corresponds to the second channel feature and that is on the second link, to forward the data to the third device by using the second logical channel.

It should be noted that, the first device may be a user terminal, and the second device may be a base station or a user terminal. Correspondingly, the third device may be a user terminal or a base station. The first link may be a cellular link or a device-to-device link. Correspondingly, the second link may be a device-to-device link or a cellular link.

In this embodiment of the present invention, the first device first receives the first data sent by the second device by using the first logical channel of the multiple logical channels on the first link, and identifies the first channel feature of the first logical channel; then determines, according to the preset configuration information about the correspondence between the channel feature information about the first link and the channel feature information about the second link, the second channel feature on the second link that corresponds to the first channel feature of the first logical channel on the first link; and finally maps, according to the second channel feature, the first data onto the second logical channel that is of the multiple logical channels on the second link and that corresponds to the second channel feature, to forward the first data to the third device by using the second logical channel. Therefore, when data having different priorities is forwarded, the data may be mapped onto different logical channels for transmission, so that the data having different priorities is processed according to the different priorities, and data processing efficiency is improved.

Figure 3:
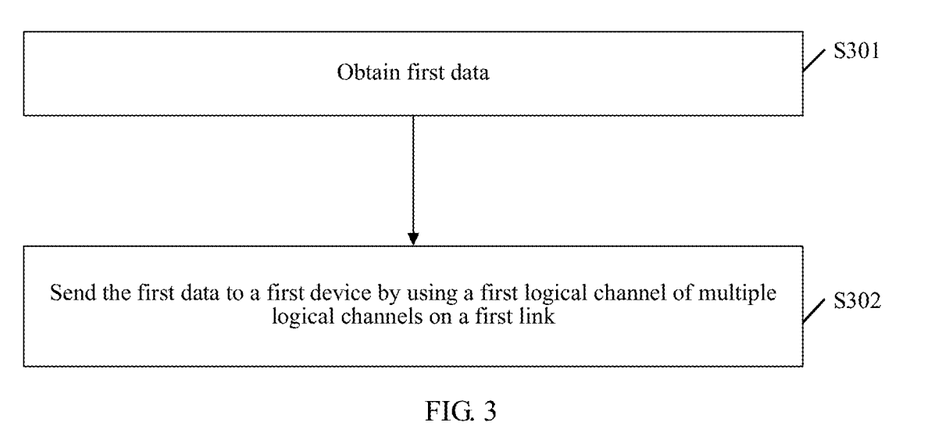
FIG. 3 is a schematic flowchart of a device-to-device D2D data transmission method according to a second embodiment of the present invention.

Referring to FIG. 3, FIG. 3 is a schematic flowchart of a device-to-device D2D data transmission method according to a second embodiment of the present invention. As shown in the figure, the method in this embodiment of the present invention includes the following steps:

S301. A second device obtains first data.

In a specific implementation, data may include data having multiple priorities, the first data may be data having a priority of the data having multiple priorities, and each of the multiple logical channels is used to transmit data having a priority. The data may include voice data and/or regular file data, and the like. A priority of the voice data is higher than that of the regular file data. The second device may obtain data having multiple priorities from its storage space, or may receive data having multiple priorities that is entered by a user.

Optionally, the second device includes a base station or a core network device, and before the obtaining first data, the method further includes:

sending, by the base station or the core network device, configuration information about a correspondence between channel feature information about a first link and channel feature information about a second link to a first device.

S302. The second device sends the first data to a first device by using a first logical channel of multiple logical channels on a first link, so that the first device determines, according to preset configuration information about a correspondence between channel feature information about the first link and channel feature information about a second link, a second channel feature on the second link that corresponds to a first channel feature of the first logical channel on the first link, and the first device further maps, according to the second channel feature, the first data onto a second logical channel that is of multiple logical channels on the second link and that corresponds to the second channel feature, to forward the first data to a third device by using the second logical channel.

In a specific implementation, the second device may first determine a channel feature of each of the logical channels on the first link; then map, according to the determined channel feature of each of the logical channels on the first link, the first data onto the first logical channel on the first link, to send data having multiple priorities to the first device. After the data is transmitted to the first device by using the multiple logical channels on the first link, the first device may identify the channel feature of each of the logical channels.

For example, as shown in FIG. 8, the data having multiple priorities includes data 1 and data 2. A priority of the data 1 is higher than that of the data 2. The first link includes a logical channel 1 and a logical channel 2. A priority of the logical channel 1 is higher than that of the logical channel 2. Therefore, the second device may map the data 1 onto the logical channel 1, and map the data 2 onto the logical channel 2. After the data is transmitted to the first device by using the logical channel 1 and the logical channel 2, the first device may identify a channel feature of the logical channel 1 and a channel feature of the logical channel 2.

Subsequently, the first device may determine, according to the preset configuration information about the correspondence between the channel feature information about the first link and the channel feature information about the second link, the second channel feature on the second link that corresponds to the first channel feature of the first logical channel on the first link. The channel feature may include at least one of a logical channel identifier, a data priority corresponding to a logical channel, or a logical channel priority. Specifically, the first device may search the preset configuration information about the correspondence between the channel feature information about the first link and the channel feature information about the second link for the first channel feature of the first logical channel, and determine the second channel feature on the second link that corresponds to the first channel feature of the first logical channel.

For example, as shown in FIG. 8, the first link includes the logical channel 1 and the logical channel 2, and the second link includes a logical channel 3 and a logical channel 4. A channel identifier of the logical channel 1 corresponds to that of the logical channel 3, and a channel identifier of the logical channel 2 corresponds to that of the logical channel 4. Therefore, after receiving the data 1 transmitted by using the logical channel 1 and the data 2 transmitted by using the logical channel 2, the first device may determine that the data 1 needs to be mapped onto the logical channel 3, and the data 2 needs to be mapped onto the logical channel 4, to forward the data to the third device.

Finally, the first device may map, according to the second channel feature, the first data onto a second logical channel that is of multiple logical channels on the second link and that corresponds to the second channel feature, to forward the first data to the third device by using the second logical channel. Specifically, the first device may determine, according to the second channel feature, the second logical channel that is of the multiple logical channels on the second link and that corresponds to the second channel feature; and map the first data onto the determined second logical channel.

In addition, if data sent by the second device has only one priority, and is transmitted to the first device by using a logical channel on the first link, the first device may also determine, in the configuration information about the correspondence between the channel feature information about the first link and the channel feature information about the second link according to a first channel feature of the logical channel, the second channel feature on the second link that corresponds to the first channel feature, and map, according to the second channel feature, the data having the priority onto the second logical channel that corresponds to the second channel feature and that is on the second link, to forward the data having the priority to the third device by using the second logical channel.

It should be noted that, the first device may be a user terminal, and the second device may be a base station or a user terminal. Correspondingly, the third device may be a user terminal or a base station. The first link may be a cellular link or a device-to-device link. Correspondingly, the second link may be a device-to-device link or a cellular link.

In this embodiment of the present invention, the first device first receives the first data sent by the second device by using the first logical channel of the multiple logical channels on the first link, and identifies the first channel feature of the first logical channel; then determines, according to the preset configuration information about the correspondence between the channel feature information about the first link and the channel feature information about the second link, the second channel feature on the second link that corresponds to the first channel feature of the first logical channel on the first link; and finally maps, according to the second channel feature, the first data onto the second logical channel that is of the multiple logical channels on the second link and that corresponds to the second channel feature, to forward the first data to the third device by using the second logical channel. Therefore, when data having different priorities is forwarded, the data may be mapped onto different logical channels for transmission, so that the data having different priorities is processed according to the different priorities, and data processing efficiency is improved.

Figure 4:
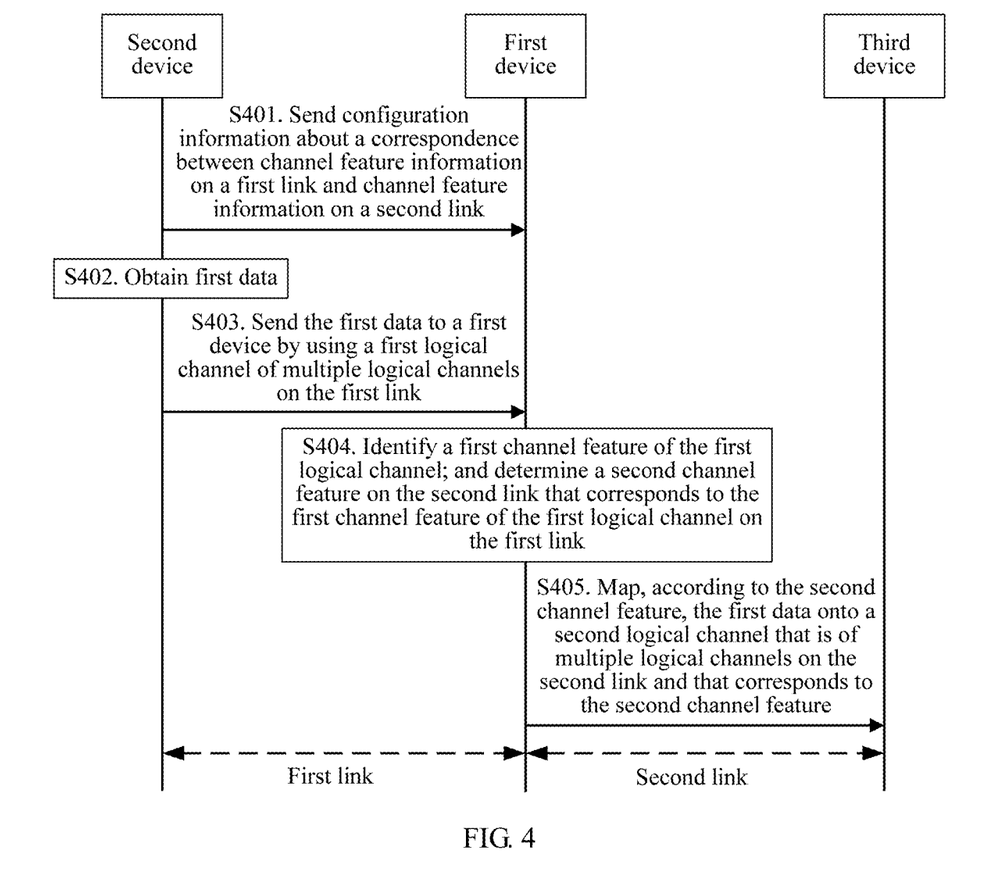
FIG. 4 is a schematic flowchart of a device-to-device D2D data transmission method according to a third embodiment of the present invention.

Referring to FIG. 4, FIG. 4 is a schematic flowchart of a device-to-device D2D data transmission method according to a third embodiment of the present invention. As shown in the figure, the method in this embodiment of the present invention includes the following steps:

S401. A base station or a core network device sends configuration information about a correspondence between channel feature information about a first link and channel feature information about a second link to a first device. A second device may include the base station or the core network device.

S402. The second device obtains first data.

In a specific implementation, data may include data having multiple priorities, the first data may be data having a priority of the data having multiple priorities, and each of the multiple logical channels is used to transmit data having a priority. The data may include voice data and/or regular file data, and the like. A priority of the voice data is higher than that of the regular file data. The second device may obtain data having multiple priorities from its storage space, or may receive data having multiple priorities that is entered by a user.

S403. The second device sends the first data to the first device by using a first logical channel of multiple logical channels on the first link.

The second device may first determine a channel feature of each of the logical channels on the first link; then map, according to the determined channel feature of each of the logical channels on the first link, the first data onto the first logical channel on the first link, to send data having multiple priorities to the first device. After the data is transmitted to the first device by using the multiple logical channels on the first link, the first device may identify the channel feature of each of the logical channels.

For example, as shown in FIG. 8, the data having multiple priorities includes data 1 and data 2. A priority of the data 1 is higher than that of the data 2. The first link includes a logical channel 1 and a logical channel 2. A priority of the logical channel 1 is higher than that of the logical channel 2. Therefore, the second device may map the data 1 onto the logical channel 1, and map the data 2 onto the logical channel 2. After the data is transmitted to the first device by using the logical channel 1 and the logical channel 2, the first device may identify a channel feature of the logical channel 1 and a channel feature of the logical channel 2.

S404. The first device determines, according to preset configuration information about a correspondence between the channel feature information about the first link and the channel feature information about the second link, a second channel feature on the second link that corresponds to the first channel feature of the first logical channel on the first link.

In a specific implementation, the channel feature information may include at least one of a logical channel identifier, a data priority corresponding to a logical channel, or a logical channel priority. The first device may first search the preset configuration information about the correspondence between channel feature information about the first link and channel feature information about a second link for the first channel feature of the first logical channel, and determine the second channel feature on the second link that corresponds to the first channel feature of the first logical channel.

For example, as shown in FIG. 8, the first link includes the logical channel 1 and the logical channel 2, and the second link includes a logical channel 3 and a logical channel 4. A channel identifier of the logical channel 1 corresponds to that of the logical channel 3, and a channel identifier of the logical channel 2 corresponds to that of the logical channel 4. Therefore, after receiving the data 1 transmitted by using the logical channel 1 and the data 2 transmitted by using the logical channel 2, the first device may determine that the data 1 needs to be mapped onto the logical channel 3, and the data 2 needs to be mapped onto the logical channel 4, to forward the data to a third device.

S405. The first device maps, according to the second channel feature, the first data onto a second logical channel that is of multiple logical channels on the second link and that corresponds to the second channel feature, to forward the first data to a third device by using the second logical channel.

In a specific implementation, the first device determines, according to the second channel feature, the second logical channel that is of the multiple logical channels on the second link and that corresponds to the second channel feature; and the first device maps the first data onto the determined second logical channel.

In addition, if data sent by the second device has only one priority, and is transmitted to the first device by using a logical channel on the first link, the first device may determine, in the configuration information about the correspondence between the channel feature information about the first link and the channel feature information about the second link according to a first channel feature of the logical channel, the second channel feature on the second link that corresponds to the first channel feature, and map, according to the second channel feature, the data having the priority onto the second logical channel that corresponds to the second channel feature and that is on the second link, to forward the data to the third device by using the second logical channel.

It should be noted that, the first device may be a user terminal, and the second device may be a base station or a user terminal. Correspondingly, the third device may be a user terminal or a base station. The first link may be a cellular link or a device-to-device link. Correspondingly, the second link may be a device-to-device link or a cellular link.

In this embodiment of the present invention, the first device first receives the first data sent by the second device by using the first logical channel of the multiple logical channels on the first link, and identifies the first channel feature of the first logical channel; determines, according to the preset configuration information about the correspondence between the channel feature information about the first link and the channel feature information about the second link, the second channel feature on the second link that corresponds to the first channel feature of the first logical channel on the first link; and finally maps, according to the second channel feature, the first data onto the second logical channel that is of the multiple logical channels on the second link and that corresponds to the second channel feature, to forward the first data to the third device by using the second logical channel. Therefore, when data having different priorities is forwarded, the data may be mapped onto different logical channels for transmission, so that the data having different priorities is processed according to the different priorities, and data processing efficiency is improved.

Figure 5:
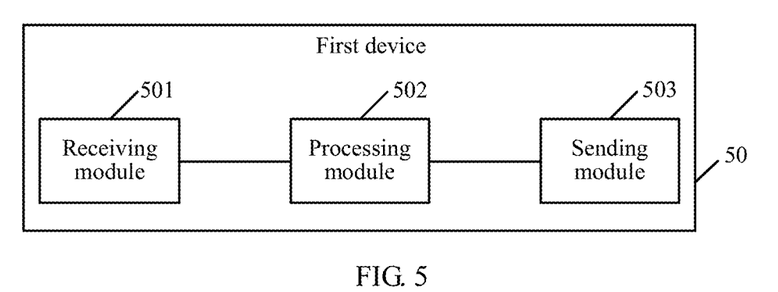
FIG. 5 is a schematic structural diagram of a device-to-device D2D data transmission apparatus according to a fourth embodiment of the present invention.

Referring to FIG. 5, FIG. 5 is a schematic structural diagram of a device-to-device D2D data transmission apparatus according to a fourth embodiment of the present invention. As shown in the figure, the apparatus in this embodiment of the present invention includes the following modules: a receiving module 501, a processing module 502, and a sending module 503.

The receiving module 501 is configured to: receive first data sent by a second device by using a first logical channel of multiple logical channels on a first link, and identify a first channel feature of the first logical channel.

In a specific implementation, data may include data having multiple priorities, the first data may be data having a priority of the data having multiple priorities, and each of the multiple logical channels is used to transmit data having a priority. The second device may first obtain the first data; and send the first data to a first device by using the first logical channel of the multiple logical channels on the first link, to send the first data to the first device. After receiving the first data, the first device may obtain the first channel feature of the first logical channel by identifying the first logical channel by using which the first data is transmitted.

For example, as shown in FIG. 8, the data having multiple priorities includes data 1 and data 2. A priority of the data 1 is higher than that of the data 2. The first link includes a logical channel 1 and a logical channel 2. A priority of the logical channel 1 is higher than that of the logical channel 2. Therefore, the second device may map the data 1 onto the logical channel 1, and map the data 2 onto the logical channel 2. After the data is transmitted to the first device by using the logical channel 1 and the logical channel 2, the first device may identify a channel feature of the logical channel 1 and a channel feature of the logical channel 2.

Optionally, the second device includes a base station or a core network device, or a third device may include a base station or a core network device. The receiving module 501 is further configured to receive configuration information about a correspondence that is sent by the base station or the core network device and that is between channel feature information about the first link and channel feature information about a second link.

The processing module 502 is configured to: determine, according to the preset configuration information about the correspondence between channel feature information about the first link and channel feature information about the second link, a second channel feature on the second link that corresponds to the first channel feature of the first logical channel on the first link.

In a specific implementation, the second device may include the base station or the core network device. Before receiving the first data sent by the second device by using the first logical channel of the multiple logical channels on the first link, the first device may receive the configuration information about the correspondence that is sent by the base station or the core network device and that is between the channel feature information about the first link and the channel feature information about the second link. The channel feature information may include at least one of a logical channel identifier, a data priority corresponding to a logical channel, or a logical channel priority. The first device may first search the preset configuration information about the correspondence between channel feature information about the first link and channel feature information about the second link for the first channel feature of the first logical channel, and determine the second channel feature on the second link that corresponds to the first channel feature of the first logical channel.

For example, as shown in FIG. 8, the first link includes the logical channel 1 and the logical channel 2, and the second link includes a logical channel 3 and a logical channel 4. A channel identifier of the logical channel 1 corresponds to that of the logical channel 3, and a channel identifier of the logical channel 2 corresponds to that of the logical channel 4. Therefore, after receiving the data 1 transmitted by using the logical channel 1 and the data 2 transmitted by using the logical channel 2, the first device may determine that the data 1 needs to be mapped onto the logical channel 3, and the data 2 needs to be mapped onto the logical channel 4, to forward the data to the third device.

The sending module 503 is configured to: map, according to the second channel feature, the first data onto a second logical channel that is of multiple logical channels on the second link and that corresponds to the second channel feature, to forward the first data to a third device by using the second logical channel.

In a specific implementation, the first device may determine, according to the second channel feature, the second logical channel that is of the multiple logical channels on the second link and that corresponds to the second channel feature; and map the first data onto the determined second logical channel.

In addition, if data sent by the second device has only one priority, and is transmitted to the first device by using a logical channel on the first link, the first device may determine, in the configuration information about the correspondence between the channel feature information about the first link and the channel feature information about the second link according to a first channel feature of the logical channel, the second channel feature on the second link that corresponds to the first channel feature, and map, according to the second channel feature, the data having the priority onto the second logical channel that corresponds to the second channel feature and that is on the second link, to forward the data to the third device by using the second logical channel.

It should be noted that, the first device may be a user terminal, and the second device may be a base station or a user terminal. Correspondingly, the third device may be a user terminal or a base station. The first link may be a cellular link or a device-to-device link. Correspondingly, the second link may be a device-to-device link or a cellular link.

In this embodiment of the present invention, the first device first receives the first data sent by the second device by using the first logical channel of the multiple logical channels on the first link, and identifies the first channel feature of the first logical channel; determines, according to the preset configuration information about the correspondence between the channel feature information about the first link and the channel feature information about the second link, the second channel feature on the second link that corresponds to the first channel feature of the first logical channel on the first link; and finally maps, according to the second channel feature, the first data onto the second logical channel that is of the multiple logical channels on the second link and that corresponds to the second channel feature, to forward the first data to the third device by using the second logical channel. Therefore, when data having different priorities is forwarded, the data may be mapped onto different logical channels for transmission, so that the data having different priorities is processed according to the different priorities, and data processing efficiency is improved.

Figure 6:
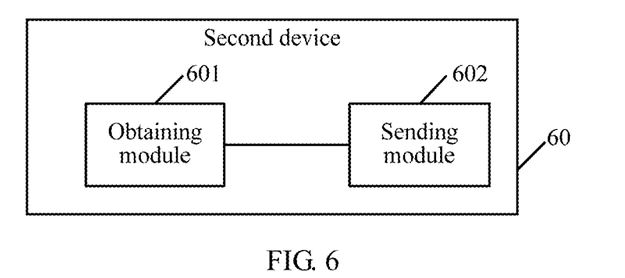
FIG. 6 is a schematic structural diagram of a device-to-device D2D data transmission apparatus according to a fifth embodiment of the present invention.

Referring to FIG. 6, FIG. 6 is a schematic structural diagram of a device-to-device D2D data transmission apparatus according to a fifth embodiment of the present invention. As shown in the figure, the apparatus in this embodiment of the present invention includes: an obtaining module 601 and a sending module 602.

The obtaining module 601 is configured to obtain first data.

In a specific implementation, data may include data having multiple priorities, the first data may be data having a priority of the data having multiple priorities, and each of the multiple logical channels is used to transmit data having a priority. The data may include voice data and/or regular file data, and the like. A priority of the voice data is higher than that of the regular file data. A second device may obtain data having multiple priorities from its storage space, or may receive data having multiple priorities that is entered by a user.

The sending module 602 is configured to send the first data to a first device by using a first logical channel of multiple logical channels on a first link, so that the first device determines, according to preset configuration information about a correspondence between channel feature information about the first link and channel feature information about a second link, a second channel feature on the second link that corresponds to a first channel feature of the first logical channel on the first link, and the first device further maps, according to the second channel feature, the first data onto a second logical channel that is of multiple logical channels on the second link and that corresponds to the second channel feature, to forward the first data to a third device by using the second logical channel.

In a specific implementation, the second device may first determine a channel feature of each of the logical channels on the first link; and map, according to the determined channel feature of each of the logical channels on the first link, the first data onto the first logical channel on the first link, to send data having multiple priorities to the first device. After the data is transmitted to the first device by using the multiple logical channels on the first link, the first device may identify the channel feature of each of the logical channels.

For example, as shown in FIG. 8, the data having multiple priorities includes data 1 and data 2. A priority of the data 1 is higher than that of the data 2. The first link includes a logical channel 1 and a logical channel 2. A priority of the logical channel 1 is higher than that of the logical channel 2. Therefore, the second device may map the data 1 onto the logical channel 1, and map the data 2 onto the logical channel 2. After the data is transmitted to the first device by using the logical channel 1 and the logical channel 2, the first device may identify a channel feature of the logical channel 1 and a channel feature of the logical channel 2.

Optionally, the sending module 602 may be further configured to: send the configuration information about the correspondence between the channel feature information about the first link and the channel feature information about the second link to the first device.

Subsequently, the first device may determine, according to the preset configuration information about the correspondence between the channel feature information about the first link and the channel feature information about the second link, the second channel feature on the second link that corresponds to the first channel feature of the first logical channel on the first link. The channel feature may include at least one of a logical channel identifier, a data priority corresponding to a logical channel, or a logical channel priority. Specifically, the first device may search the preset configuration information about the correspondence between the channel feature information about the first link and the channel feature information about the second link for the first channel feature of the first logical channel, and determine the second channel feature on the second link that corresponds to the first channel feature of the first logical channel.

For example, as shown in FIG. 8, the first link includes the logical channel 1 and the logical channel 2, and the second link includes a logical channel 3 and a logical channel 4. A channel identifier of the logical channel 1 corresponds to that of the logical channel 3, and a channel identifier of the logical channel 2 corresponds to that of the logical channel 4. Therefore, after receiving the data 1 transmitted by using the logical channel 1 and the data 2 transmitted by using the logical channel 2, the first device may determine that the data 1 needs to be mapped onto the logical channel 3, and the data 2 needs to be mapped onto the logical channel 4, to forward the data to the third device.

Finally, the first device may map, according to the second channel feature, the first data onto a second logical channel that is of multiple logical channels on the second link and that corresponds to the second channel feature, to forward the first data to the third device by using the second logical channel. Specifically, the first device may determine, according to the second channel feature, the second logical channel that is of the multiple logical channels on the second link and that corresponds to the second channel feature; and map the first data onto the determined second logical channel.

In addition, if data sent by the second device has only one priority, and is transmitted to the first device by using a logical channel on the first link, the first device may also determine, in the configuration information about the correspondence between the channel feature information about the first link and the channel feature information about the second link according to a first channel feature of the logical channel, the second channel feature on the second link that corresponds to the first channel feature, and map, according to the second channel feature, the data having the priority onto the second logical channel that corresponds to the second channel feature and that is on the second link, to forward the data having the priority to the third device by using the second logical channel.

It should be noted that, the first device may be a user terminal, and the second device may be a base station or a user terminal. Correspondingly, the third device may be a user terminal or a base station. The first link may be a cellular link or a device-to-device link. Correspondingly, the second link may be a device-to-device link or a cellular link.

In this embodiment of the present invention, the first device first receives the first data sent by the second device by using the first logical channel of the multiple logical channels on the first link, and identifies the first channel feature of the first logical channel; determines, according to the preset configuration information about the correspondence between the channel feature information about the first link and the channel feature information about the second link, the second channel feature on the second link that corresponds to the first channel feature of the first logical channel on the first link; and finally maps, according to the second channel feature, the first data onto the second logical channel that is of the multiple logical channels on the second link and that corresponds to the second channel feature, to forward the first data to the third device by using the second logical channel. Therefore, when data having different priorities is forwarded, the data may be mapped onto different logical channels for transmission, so that the data having different priorities is processed according to the different priorities, and data processing efficiency is improved.

Figure 7:
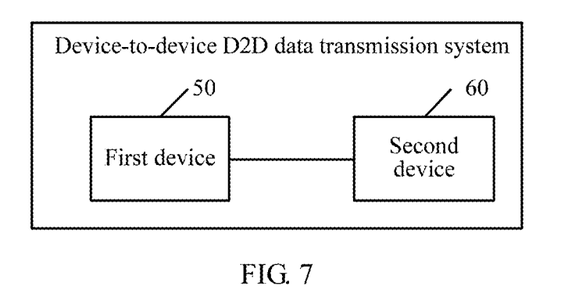
FIG. 7 is a schematic structural diagram of a device-to-device D2D data transmission system according to a sixth embodiment of the present invention.

Referring to FIG. 7, FIG. 7 is a schematic structural diagram of a device-to-device D2D data transmission system according to a sixth embodiment of the present invention. As shown in the figure, the system in this embodiment of the present invention includes:

a first device 50, configured to: receive first data sent by a second device by using a first logical channel of multiple logical channels on a first link, and identify a first channel feature of the first logical channel; determine, according to preset configuration information about a correspondence between channel feature information about the first link and channel feature information about a second link, a second channel feature on the second link that corresponds to the first channel feature of the first logical channel on the first link; and map, according to the second channel feature, the first data onto a second logical channel that is of multiple logical channels on the second link and that corresponds to the second channel feature, to forward the first data to a third device by using the second logical channel; and a second device 60, configured to: obtain the first data; send the first data to the first device by using the first logical channel of the multiple logical channels on the first link, so that the first device determines, according to the preset configuration information about the correspondence between the channel feature information about the first link and the channel feature information about the second link, the second channel feature on the second link that corresponds to the first channel feature of the first logical channel on the first link, and the first device further maps, according to the second channel feature, the first data onto the second logical channel that is of the multiple logical channels on the second link and that corresponds to the second channel feature, to forward the first data to the third device by using the second logical channel.

Figure 9:
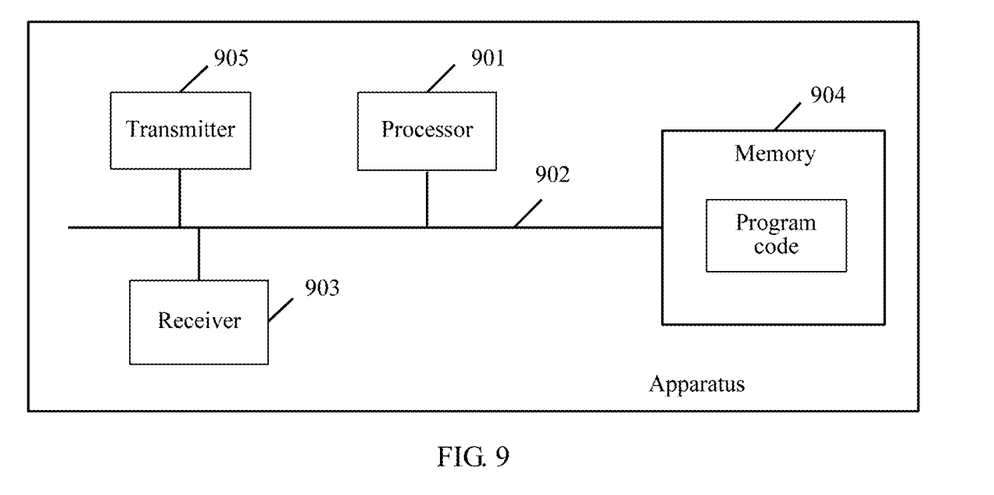
FIG. 9 is a schematic structural diagram of a device-to-device D2D data transmission apparatus according to a seventh embodiment of the present invention.

FIG. 9 is a schematic structural diagram of a device-to-device D2D data transmission apparatus according to a seventh embodiment of the present invention. The apparatus may include a user terminal or a base station. As shown in the figure, the apparatus may include: at least one processor 901, such as a CPU, at least one receiver 903, at least one memory 904, at least one transmitter 905, and at least one communications bus 902. The communications bus 902 is configured to implement connection and communication between the components. The memory 904 may be a high-speed RAM memory, or a non-volatile memory (non-volatile memory), such as at least one magnetic disk storage. Optionally, the memory 904 may further be at least one storage apparatus that is located far away from the processor 901. The memory 904 stores a set of program code, and the processor 901 is configured to invoke the program code stored in the memory. The apparatus performs the following operations:

The receiver 903 receives first data sent by a second device by using a first logical channel of multiple logical channels on a first link, and identifies a first channel feature of the first logical channel.

The processor 901 determines, according to preset configuration information about a correspondence between channel feature information about the first link and channel feature information about a second link, a second channel feature on the second link that corresponds to the first channel feature of the first logical channel on the first link.

The transmitter 905 maps, according to the second channel feature, the first data onto a second logical channel that is of multiple logical channels on the second link and that corresponds to the second channel feature, to forward the first data to a third device by using the second logical channel.

Optionally, the second device includes a base station or a core network device, and the first device receives the configuration information about the correspondence that is sent by the base station or the core network device and that is between the channel feature information about the first link and the channel feature information about the second link.

Optionally, the first device receives the configuration information about the correspondence that is sent by the base station or the core network device and that is between the channel feature information about the first link and the channel feature information about the second link.

Optionally, the first device determines, according to the second channel feature, the second logical channel that is of the multiple logical channels on the second link and that corresponds to the second channel feature.

The first device maps the first data onto the determined second logical channel.

Optionally, the channel feature information includes at least one of a logical channel identifier, a data priority corresponding to a logical channel, or a logical channel priority.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, refer to related descriptions in other embodiments.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (Read-Only Memory, ROM), a random access memory (Random Access Memory, RAM), a magnetic disk, and an optical disc.

The content downloading method, the related device, and the system provided in the embodiments of the present invention are described in detail above. The principle and implementation of the present invention are described herein by using specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. A method for device-to-device (D2D) data transmission performed by a first device, the method comprising:
   receiving first data from a second device on a first logical channel of a first link between the first device and the second device;
   determining a second logical channel of a second link between the first device and a third device, wherein a channel feature of the second logical channel corresponds to a channel feature of the first logical channel of the first link; and
   transmitting the first data to the third device by mapping the first data onto the second logical channel of the second link, wherein
   the channel feature comprises a logical channel identifier, a data priority corresponding to a logical channel, or a logical channel priority.

2. The method according to claim 1, wherein the second device comprises a base station or a core network device, the method further comprises:
   receiving, from the second device, first configuration information about a correspondence between the channel feature of the first logical channel of the first link and the channel feature of the second logical channel of the second link.

3. The method according to claim 1, wherein the third device comprises a base station or a core network device, the method further comprises:
   receiving, from the third device, second configuration information about a correspondence between the channel feature of the first logical channel of the first link and the channel feature of the second logical channel of the second link.

4. The method according to claim 2, wherein the first configuration information further indicates a correspondence between the channel feature of a third logical channel of the first link and the channel feature of a fourth logical channel of the second link.

5. A method of device-to-device (D2D) data transmission performed by a second device, the method comprising:

transmitting first data to a first device on a first logical channel of a first link between the first device and the second device; and transmitting, to the first device, configuration information about a correspondence between a channel feature of the first logical channel of the first link and a channel feature of a second logical channel of a second link between the first device and a third device; wherein the channel feature comprises a logical channel identifier, a data priority corresponding to a logical channel, or a logical channel priority.

6. The method according to claim 5, wherein the second device comprises a base station or a core network device.

7. The method according to claim 5, wherein the configuration information further indicates a correspondence between a channel feature of a third logical channel of the first link and a channel feature of a fourth logical channel of the second link.

8. An apparatus for device-to-device (D2D) data transmission, the apparatus comprising:
 a memory for storing instructions; and
 a processor coupled to the memory and configured to execute the instructions, wherein the instructions, when executed, cause the apparatus comprising a first device to:
 receive first data from a second device on a first logical channel of a first link between the first device and the second device;
 determine a second logical channel of a second link between the apparatus and a third device, wherein a channel feature of the second logical channel corresponds to a channel feature of the first logical channel of the first link; and
 transmit the first data to the third device by mapping the first data onto the second logical channel of the second link, wherein
 the channel feature comprises a logical channel identifier, a data priority corresponding to a logical channel, or a logical channel priority.

9. The apparatus according to claim 8, wherein the second device comprises a base station or a core network device; and
 the apparatus is further configured to receive first configuration information about a correspondence between the channel feature of the first logical channel of the first link and the channel feature of the second logical channel of the second link from the second device.

10. The apparatus according to claim 9, wherein the first configuration information further indicates a correspondence between a channel feature of a third logical channel of the first link and a channel feature of a fourth logical channel of the second link.

11. The apparatus according to claim 8, wherein the third device comprises a base station or a core network device; and
 the apparatus is further configured to receive second configuration information about a correspondence between the channel feature of the first logical channel of the first link and the channel feature of the second logical channel of the second link from the third device.

12. An apparatus for device-to-device (D2D) data transmission, the apparatus comprising:
 a memory for storing instructions; and
 a processor coupled to the memory and configured to execute the instructions, wherein the instructions, when executed, cause the apparatus to:
 transmit first data to a first device on a first logical channel of a first link; and
 transmit, to the first device, configuration information about a correspondence between a channel feature of the first logical channel of the first link and a channel feature of a second logical channel of a second link between the first device and a third device, wherein
 the channel feature comprises a logical channel identifier, a data priority corresponding to a logical channel, or a logical channel priority.

13. The apparatus according to claim 12, wherein the configuration information further indicates a correspondence between a channel feature of a third logical channel of the first link and a channel feature of a fourth logical channel of the second link.

14. A device-to-device (D2D) data transmission system, comprising:
 a first device;
 a second device; and
 a third device wherein
 the second device is configured to transmit first data to the first device on a first logical channel of a first link;
 the first device is configured to determine a second logical channel of a second link between the first device and the third device, wherein a channel feature of the second logical channel corresponds to a channel feature of the first logical channel of the first link; and
 the first device is further configured to transmit the first data to the third device by mapping the first data onto the second logical channel of the second link, wherein
 the channel feature comprises a logical channel identifier, a data priority corresponding to a logical channel, or a logical channel priority.

15. The system according to claim 14, wherein the second device comprises a base station or a core network device; and
 the second device is further configured to transmit first configuration information about a correspondence between the channel feature of the first logical channel of the first link and the channel feature of the second logical channel of the second link to the first device.

16. The system according to claim 15, wherein the first configuration information further indicates a correspondence between a channel feature of a third logical channel of the first link and a channel feature of a fourth logical channel of the second link.

17. The system according to claim 14, wherein the third device comprises a base station or a core network device; and
 the third device is further configured to transmit second configuration information about a correspondence between the channel feature of the first logical channel of the first link and the channel feature of the second logical channel of the second link to the first device.

* * * * *